2,838,415

PHTHALOCYANINE LAKES

Robert E. Brouillard, Westfield, and Thomas D. Mutaffis, North Plainfield, N. J., assignors to General Aniline & Film Corporation, New York, N. Y., a corporation of Delaware No Drawing. Original application September 18, 1953, Serial No. 381,149, now Patent No. 2,774,677, dated December 18, 1956. Divided and this application January 27, 1956, Serial No. 561,918

8 Claims. (Cl. 106—289)

This invention relates to phthalocyanine lakes and more particularly to an improved process for the manufacture of metallic resinate lakes of phthalocyanine colors.

The phthalocyanine pigments are a group of brilliant blue to green tinctorially stable compounds of great importance in the pigmentation of surface coating compositions. Although this group of pigments excels all others in general fastness properties, they suffer from texture and rheological deficiencies.

The texture of a pigment has been defined as the ability of the pigment to disperse to complete strength and freedom from grit aggregates. In the usual processing technique for the manufacture of phthalocyanine pigments the crude bases as obtained from the reaction mixtures are acid pasted and then dried. During the drying operation hard aggregates are formed which are not entirely ruptured by hammer milling and are dispersed to fine ultimate particle size only with considerable difficulty. This difficulty in dispersion causes great concern in the manufacture of paints, enamels, lacquers, printing inks, linoleum, and colored plastics because an excessively long grinding in the vehicle becomes necessary to achieve maximum color value and adequate gloss in the final composition.

Phthalocyanines are rheologically deficient since, when formulated into lithographic varnishes, the printing ink systems produced are very short and buttery and are therefore lacking in tack and ability to feed properly from the printing press fountains.

Many attempts have been made to improve the texture and rheological properties of the phthalocyanine pigments. One of such attempts is disclosed in United States Letters Patent No. 2,173,699 which describes resinations. Although the process described in this patent represents a substantial improvement over the prior art, it is lacking in that large product quality variations result from small differences in processing technique and the pigmentary texture obtained is deficient. Thus, agitation, resin quality variations, pH of the system, and many uncontrollable factors profoundly affect the quality of the pigment produced. Furthermore, the phthalocyanine to be resinated must be specially prepared to be suitable. Still further, the product obtained develops relatively slowly in strength and freedom from grit when ground into a vehicle.

It is an object of this invention to provide a process for the preparation of phthalocyanine lakes which consistently gives products of quality superior to that obtained in the prior art. Other objects and advantages will become apparent from the following description.

The above objects are attained by the instant invention which comprises forming the alkaline earth metal resinate lake of a water-insoluble phthalocyanine coloring matter in the presence of an ammonium salt of a strong acid.

All water-insoluble phthalocyanines are suitable for treatment by the present invention. Metal-free and metal phthalocyanines as well as the various substitution products thereof give excellent results provided they are water-insoluble, e. g. suitable as pigments. The process is also applicable to mixtures of phthalocyanines with other pigments but in such combinations it is essential that the phthalocyanine be the largest component. The physical condition of the pigment to be laked is not critical. Thus products such as obtained in United States Letters Patent No. 2,334,812 and FIAT 1313, vol. III, p. 295, are suitable and give comparable results.

The alkaline earth metal resinate may be derived from rosin and its derivatives such as chlorinated, nitrated, arylated, oxidized, dehydrogenated and hydrogenated abietic acid and rosins, tall oil, Venice turpentine, various other resin acids such as those derived from plants of the genus angiospermae, e. g., ammoniacum, Gamboge resin, liquid styrax and mastic, and the like. The preferred metal is barium, although other alkaline earth metals may be employed such as calcium and strontium. While the quantity of the alkaline earth metal resinate in the lake may be varied within wide limits, the best balance of properties and dilution is obtained with proportions of from 20 to 30% by weight, although proportions of from 5 to 100% produce improved results.

The ammonium salts of strong acids which are effective in the process of this invention are ammonium sulfate, ammonium nitrate, ammonium acetate, ammonium phosphate, and ammonium chloride, and the like. We prefer to use ammonium chloride because it is most effective and does not introduce an additional diluent as is the case with ammonium sulfate which causes coprecipitation of the metal sulfate with the lake. The lower effective concentrations of ammonium salt are about 0.1 part per part of pigment. The upper limit is not critical and may be as great as 10 parts. Such high usages do not offer substantial advantages and are therefore not practical economically. Our preferred usage is from 0.5 to 3 parts per part of pigment.

The conditions under which lake formation occurs may be varied over wide limits and yet give comparable results. Thus, agitation may be varied from mild to extremely vigorous, the sodium, potassium, ammonium or other water soluble salts of the resin may be used, resins of widely varying grades are effective, the temperature may be varied from 25–100°, and the laking operation may be slow or very rapid. The flexibility with which these several variables may be modified is one of the very substantial advantages of this invention.

In general, a solution of a water-soluble alkaline earth metal salt is mixed with a solution of a water-soluble salt (soap) of a resin acid in the presence of the water-insoluble phthalocyanine coloring matter and the addition agent of this invention. The mixing may occur in any order, it being understood that the ratio of alkaline earth metal salt to resin soap is at least stoichiometric. Thus, the solution of the alkaline earth metal salt may be added to the solution of the resin soap containing the phthalocyanine coloring matter dispersed therein or the resin soap solution may be added to the alkaline earth metal salt solution containing the phthalocyanine coloring matter dispersed therein. The addition agent of this invention may be present in either of the solutions which are mixed to cause precipitation of the metallic resinate on the phthalocyanine coloring matter. It is preferred, however, to carry out the invention by adding the ammonium salt to a dispersion of the phthalocyanine coloring matter, adding a solution of the resin acid soap to the slurry, and then adding the water-soluble alkaline earth metal salt thereto to cause precipitation of the metallic resinate. Although not absolutely necessary, the slurry containing the phthalocyanine coloring matter and the addition agent is made alkaline before addition of the resin acid soap where too low a pH would cause premature precipitation of the resin acid soap before addition of the alkaline earth metal salt.

Our invention will be further illustrated by the following example. It is to be understood, however, that it is not restricted thereto. The parts are by weight unless otherwise indicated:

*Example*

45 parts of copper hexadecachlorophthalocyanine as 184 parts of an acid pasted presscake were added to 716 parts of water and the mixture stirred until a homogeneous slurry was obtained. Sufficient aqueous ammonia to adjust the pH to 7.5–8, and 4.5 parts of ammonium chloride were added and the mixture heated to 95° C.

A rosin solution made by heating 8 parts of wood rosin, 165 parts of water and 1.6 parts of sodium hydroxide was added to the hot pigment slurry.

The mixture was agitated at 95–98° C. for 30 minutes after which a solution of 4.5 parts of barium chloride in 45 parts of water was added. The slurry was then boiled for 30 minutes at which point sufficient water was added to cool to 65° C.

The product was isolated by filtration, washed and dried.

The resinated copper hexadecachlorophthalocyanine produced was much superior in texture to the product obtained without addition of ammonium chloride.

Substitution of calcium chloride or strontium chloride for the barium chloride employed in the above example produced substantially similar results.

Other modifications and variations of this invention will be obvious to the person skilled in the art and it is to be understood that such modifications and variations are to be included within the purview of this application and the spirit and scope of the appended claims.

This application is a division of our application Serial No. 381,149, filed September 18, 1953, now U. S. Patent No. 2,774,677.

We claim:

1. In a process for the manufacture of a phthalocyanine lake in which a water-insoluble alkaline earth metal resinate is precipitated by reaction between a water soluble alkaline earth metal salt and a water soluble salt of a resin acid in an aqueous medium in the presence of a water-insoluble phthalocyanine coloring matter, the improvement which comprises effecting the precipitation in the presence of about 0.1 to 10 parts by weight of an ammonium salt of a strong acid per part of said coloring matter.

2. A process as defined in claim 1, wherein the precipitation is effected in the presence of ammonium chloride.

3. A process as defined in claim 2 wherein the phthalocyanine coloring matter is copper phthaloycanine.

4. A process as defined in claim 2 wherein the phthalocyanine coloring matter is copper hexadecachlorophthalocyanine.

5. A process as defined in claim 1 wherein the alkaline earth metal resinate is barium rosinate.

6. A process as defined in claim 5 wherein the precipitation is effected in the presence of ammonium chloride.

7. A process as defined in claim 6 wherein the phthalocyanine coloring matter is copper phthalocyanine.

8. A process as defined in claim 6 wherein the phthalocyanine coloring matter is copper hexadecachlorophthalocyanine.

References Cited in the file of this patent

UNITED STATES PATENTS

| | | |
|---|---|---|
| 2,013,090 | Erskine | Sept. 3, 1935 |
| 2,173,699 | Siegel | Sept. 19, 1939 |
| 2,350,524 | O'Neal | June 6, 1944 |
| 2,426,140 | Bollaert | Aug. 17, 1947 |
| 2,526,345 | Giambalvo | Oct. 17, 1950 |
| 2,549,842 | Moser | Apr. 24, 1951 |
| 2,774,677 | Brouillard et al. | Dec. 18, 1956 |

FOREIGN PATENTS

| | | |
|---|---|---|
| 714,083 | Great Britain | Aug. 25, 1954 |